(12) United States Patent
Wood (10) Patent No.: US 11,823,547 B2
(45) Date of Patent: Nov. 21, 2023

(54) SYSTEM AND METHOD OF NON-INTRUSIVE ALERTS FOR MONITORING VULNERABLE PEOPLE

(71) Applicant: ARRIS Enterprises LLC, Suwanee, GA (US)

(72) Inventor: Kevin S. Wood, West Yorkshire (GB)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 17/318,314

(22) Filed: May 12, 2021

(65) Prior Publication Data

US 2022/0068105 A1 Mar. 3, 2022

Related U.S. Application Data

(60) Provisional application No. 63/071,091, filed on Aug. 27, 2020.

(51) Int. Cl.
*G08B 21/04* (2006.01)
*G08B 27/00* (2006.01)
*H04N 21/442* (2011.01)
*H04N 21/658* (2011.01)

(52) U.S. Cl.
CPC ..... *G08B 21/0423* (2013.01); *G08B 21/0484* (2013.01); *G08B 27/005* (2013.01); *H04N 21/44204* (2013.01); *H04N 21/6582* (2013.01)

(58) Field of Classification Search
CPC ............ G08B 21/0423; G08B 21/0484; G08B 27/005; H04N 21/44204; H04N 21/6582; H04N 7/18; G06V 40/1306
See application file for complete search history.

(56) References Cited

U.S. PATENT DOCUMENTS

| | | | |
|---|---|---|---|
| 10,412,450 B1* | 9/2019 | Savarkar | H04L 65/612 |
| 2010/0058395 A1* | 3/2010 | Goergen | H04N 21/4516 |
| | | | 725/58 |
| 2014/0075464 A1* | 3/2014 | McCrea | H04L 43/16 |
| | | | 709/206 |
| 2019/0244508 A1* | 8/2019 | Lenssen | A61B 5/0022 |

\* cited by examiner

*Primary Examiner* — Alazar Tilahun
(74) *Attorney, Agent, or Firm* — Panitch Schwarze Belisario & Nadel LLP (57) ABSTRACT

An exemplary system can generate an alert to a caregiver or other concerned parties when a usage pattern of a multimedia device differs by a preset amount. The multimedia device can record typical usage of the device and determine a pattern. The pattern is compared with real-time usage to determine when a different pattern is being done and if it is outside a preset amount generate an alert to a caregiver. This allows for non-intrusive monitoring of individuals that use the multimedia device on a regular basis.

21 Claims, 5 Drawing Sheets

SYSTEM AND METHOD OF NON-INTRUSIVE ALERTS FOR MONITORING VULNERABLE PEOPLE

FIELD

The method and related system provides non-intrusive monitoring and reporting based on the usage of a monitored multimedia device. The use of this method allows a caregiver or other concerned party to be notified when the usage of a monitored multimedia device is unusual.

BACKGROUND

As reliance on technology continues to expand, many homes include a plethora of connected digital devices. Devices such as televisions and/or set-top-boxes are frequently used on a predictable schedule. For example a set-top-box might be tuned to a favorite news channel for the evening news every day at 6:00 p.m. Other devices such as Internet of Things (IOT) connected appliances, are also used with a discernable pattern. Often these devices record and/or transmit usage to monitoring modules and networks for purposes of directed advertisement, maintenance, and/or other uses.

A common situation today is that the elderly frequently live alone and may not have regular contact with family or friends or may not have a regular caregiver. Infrequent or irregular contact with others may raise concerns for an elderly person's safety. For example, the elderly may not always raise an alert when a health challenge, medical event, or safety concern arises. This lack of awareness or inability to notify others during a crisis may be due to a reduced mental capacity, reduced mobility, or other issue that compromises physical or mental capacity.

Existing systems can allow an individual to send an alert to a family member, friend, or monitoring service. However, these systems tend to be intrusive or require additional equipment in the home. For example alarm cords or devices with emergency buttons require an express action on the part of the vulnerable person to activate an alarm. The express action can include depressing a button, pulling a chord or pendant, or other physical action necessary to trigger the alarm. However, it is a common problem with elderly or other vulnerable people, that by the time the vulnerable person realizes they need help, they may no longer have the strength or physical capacity to perform the action needed to trigger the alarm.

SUMMARY

An exemplary system for monitoring a user for well-being, includes storage for storing one or more of a multimedia device's usage patterns. The system also includes the multimedia device which is configured to: access media content over one or more networks. It is also configured to learn one or more device usage patterns of the multimedia device based on an access history of media content and monitor a current usage of the multimedia device according to at least one of the one or more usage patterns. The system then generates an alert signal indicating an abnormality, when a current usage does not occur according to the at least one usage pattern and sends the alert signal to a remote device over the one or more networks.

An exemplary method for monitoring a user for well-being. The method includes learning one or more usage patterns of a multimedia device based on an access history of media content on said device. The method stores in an electronic storage the one or more device usage patterns of the multimedia device. The method then monitors a current usage of the multimedia device according to at least one of the one or more usage patterns and generating an alert signal indicating an abnormality, when a current usage does not occur according to the at least one usage pattern. The method sends an alert signal to a remote device over one or more networks.

A non-transitory computer readable media is disclosed having instructions to cause one or more processors to perform operations for monitoring a user for well-being. The operations include learning one or more usage patterns of a multimedia device based on an access history of media content on said device. The operation then cause the processors to store in an electronic storage the one or more device usage patterns of the multimedia device and monitor a current usage of the multimedia device according to at least one of the one or more usage patterns. The processor then generates an alert signal indicating an abnormality, when a current usage does not occur according to the at least one usage pattern and sends the alert signal to a remote device over one or more networks.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

DETAILED DESCRIPTION

Exemplary embodiments of the present disclosure provide systems and methods which provide a non-intrusive in-home system for automatically triggering an alert for elderly or vulnerable persons. The exemplary embodiments can be configured for monitoring an individual's viewing and/or usage of media content to determine a regular or recurring viewing pattern or viewing schedule, and generate an alert, which is sent to a third-party, based on any detected deviation from the regular pattern or schedule.

Figure 1:
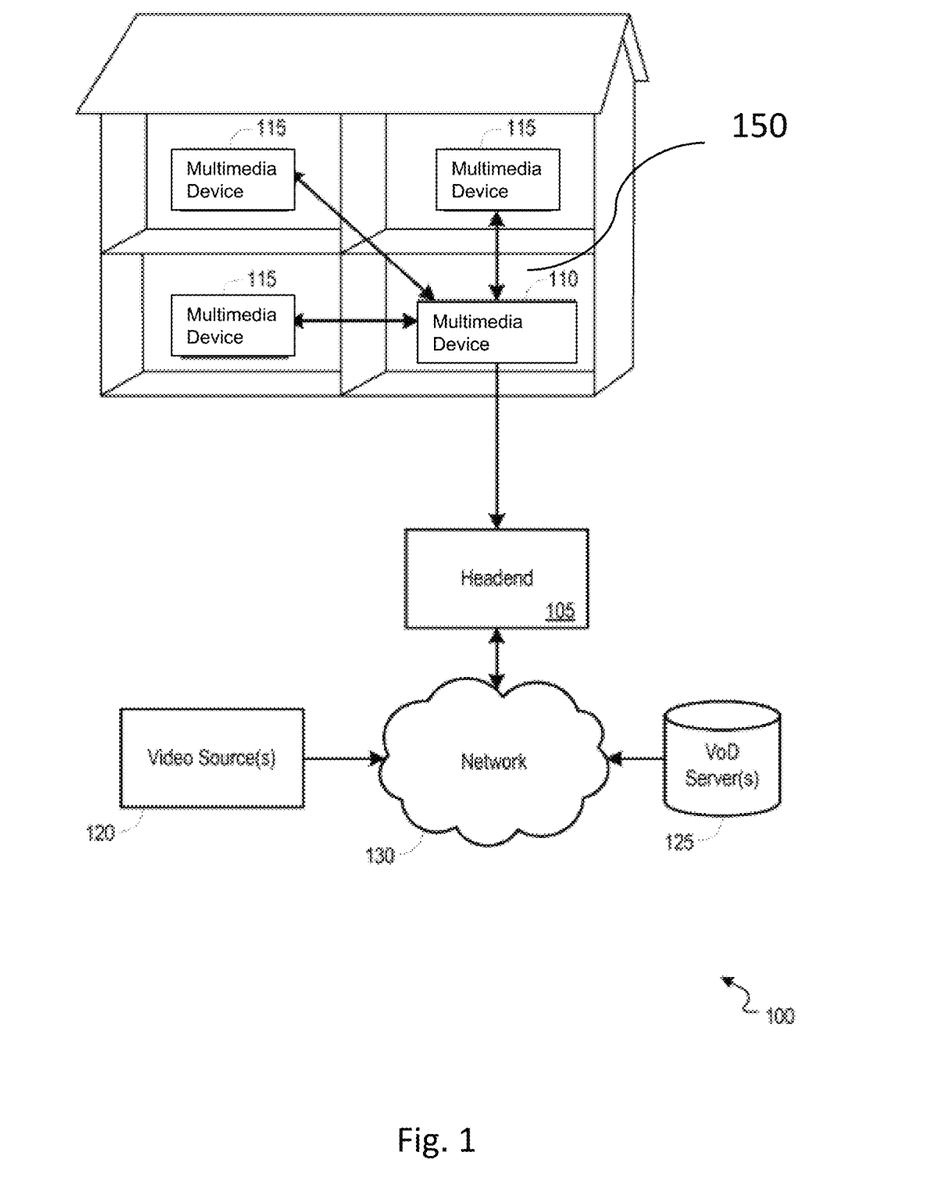
FIG. 1 is a block diagram illustrating a system for monitoring a user based on viewing or usage patterns according to an exemplary embodiment of the present disclosure.

FIG. 1 is a block diagram illustrating a system 100 for monitoring a user based on viewing or usage patterns according to an exemplary embodiment of the present disclosure. The system 100 can be arranged or disposed in a premise or environment 150, including one or more multiple rooms and one or more multimedia devices 110 and 115 connected to a network 130. According to an exemplary embodiment, a premise can include any location in which a customer or user dwells or resides either permanently or temporarily. The multimedia content can include video content, audio content, text, still images, animation, or any other suitable content as desired. The multimedia devices can include a device configured to receive multimedia content over a network and output the received multimedia content to a user. For example, the multimedia devices can include a device with an integrated display such as a television, laptop computer, tablet computer, smart-phone, or any other suitable computing device as desired. According to an exemplary embodiment, the multimedia devices 110 and 115 can also include one or more set-top-boxes (STB) configured for receiving multimedia content from a content provider. In a multiple STB or multimedia device configuration, the environment can include at least one master STB or multimedia device 110 and one or more client STBs or multimedia devices 115 to distribute the multimedia content to different rooms or locations within the environment. The multimedia devices can be connected via a wired or wireless local area network (LAN) such as Ethernet, Bluetooth, Wi-Fi, or any other suitable wireless network as desired. According to still another exemplary embodiment, multimedia devices can include smart speakers, home automation devices, smart devices, virtual assistants, smart displays, smart appliances, Internet of things devices (IOT), and any other device suitable and/or or configured to receive, deliver, and/or output multimedia content to a user.

According to exemplary embodiments, the system can include a headend 105 which can be configured to receive multimedia content, such as video service(s) from a content provider over a network 130. For example, the headend 105 can receive video content from one or more video sources 120 or one or more video-on-demand (VoD) servers 125 via the network 130. The headend 105 can provide the received video content to the one or more multimedia devices 110 arranged in the environment. According to exemplary embodiments, the headend 105 can deliver live multimedia content (e.g., media streaming in real time from a television channel) to one or more multimedia devices 110 and 115. In embodiments, the live multimedia content can include playback of a record buffer associated with a buffered channel, pay-per view channels, and other types of content delivered from a headend 105 to one or more multimedia devices 100 and 115. According to other exemplary embodiments, a headend 105 can deliver stored content (e.g., VoD signals) to the one or more multimedia devices 110, 115. In embodiments, a customer can access content stored on a multimedia device (e.g., DVR content).

According to exemplary embodiments described herein, the multimedia device 110 can facilitate communications from the headend 105 to a television and/or one or more dependent set-top boxes or multimedia players 115. For example, one or more dependent or client set-top boxes or multimedia players 115 can be connected to a master multimedia device 110 and set-top boxes or multimedia players 115 can be located in one or more different locations or rooms within a customer's premise.

According to exemplary embodiments, the headend 105 can take multiple forms. The headend can be a cable provider, a satellite provider, an Internet provider (IP), a broadcast service, and/or other similar service providers. A broadcast service could provide television signals via UHF or VHF and other well-known bands that is received at a headend by an antenna and receiver or other appropriate means.

Figure 2:
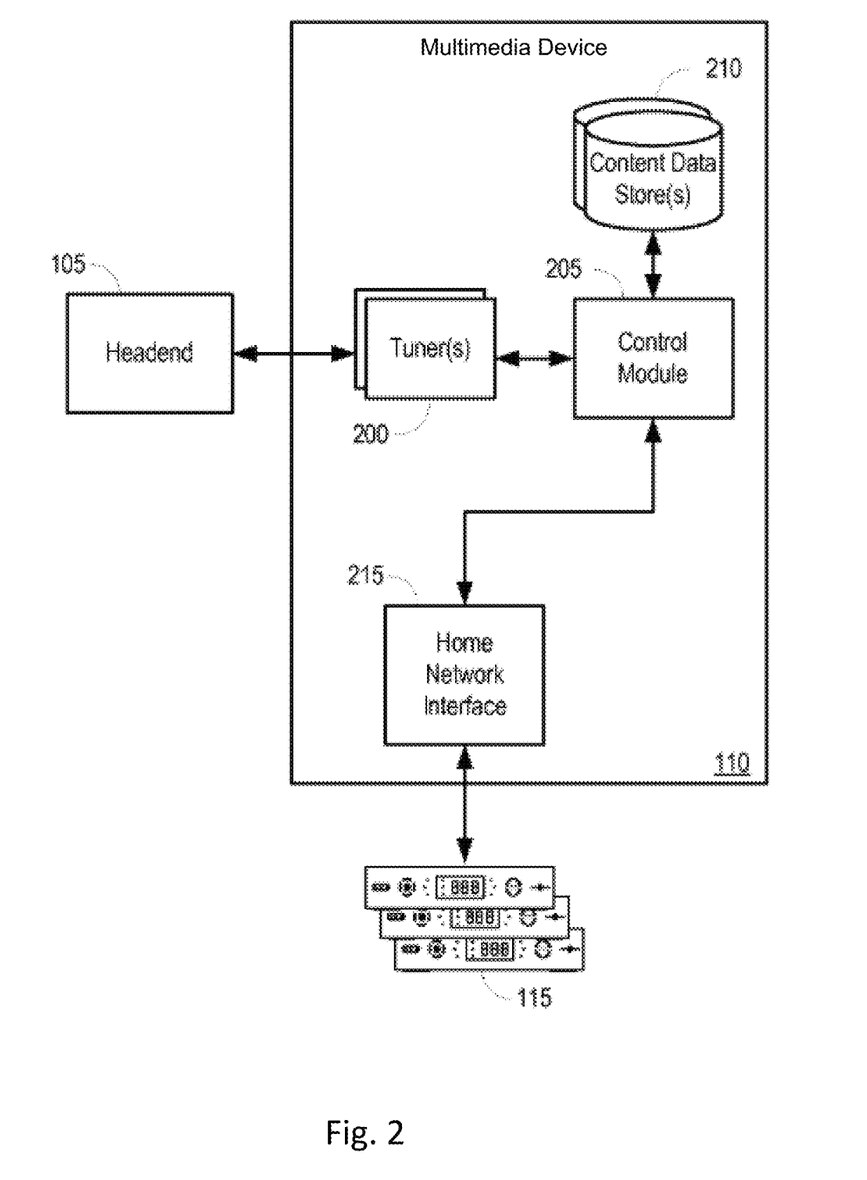
FIG. 2 is a block diagram illustrating an example multimedia device in accordance with an exemplary embodiment of the present disclosure.

FIG. 2 is a block diagram illustrating an exemplar multimedia device 110 in accordance with an exemplary embodiment of the present disclosure. As shown in FIG. 2, the multimedia device 110 can include one or more tuners 200, a control module 205 (e.g., a processor), one or more content data stores 210 and a home network interface 215.

The multimedia device 110 can receive video content from one or more video source(s) 120 (FIG. 1) or VoD server(s) 125 (FIG. 1) can be received through the one or more tuner(s) 200 via an interface with the headend 105, According to an exemplary embodiment, the multimedia device 110 can include more than one tuner 200, which can allow a customer to view content from a first channel on a display device connected to a multimedia device 110 while another multimedia device 115 records content from a plurality of other channels. According to another exemplary embodiment, the multimedia device 110 can record content from a number of channels equal to the number of tuners 200 in the multimedia device 110. It should be understood that a tuner 200 may be a single device used to capture information related to a channel or program, or the tuner 200 may be a virtual tuner 200 that uses IP or other protocols to access information related to a specific channel or program. For example, for a device attached to a CATV hybrid fiber coaxial (HFC) network, a narrowband quadrature amplitude modulation (QAM) tuner, a wideband tuner, or a collection of narrowband tuners can be used to access a program stream within a data over cable service interface specification (DOCSIS) bonded channel. Other implementations using other broadband access networks may not use explicit tuners 200, but can extract the relevant channel or program information directly from an IP network.

The multimedia device 110, 115 may include a control module 205 that can take the form of a processor, CPU, or other similar components. The control module 205 may be configured to perform the functions of the multimedia device 110 discussed herein as will be apparent to persons having skill in the relevant art. The control module 205 may include and/or be comprised of a plurality of engines and/or modules specifically configured to perform one or more functions of the multimedia device 110. As used herein, the term "module" may be software or hardware particularly programmed to receive an input, perform one or more processes using the input, and provide an output. The input, output, and processes performed by various modules will be apparent to one skilled in the art based upon the present disclosure. The control module 205 as discussed herein may be a single processor, a plurality of processors, or combinations thereof, which may also include processors that may have one or more processor "cores." Operations performed by the control module 205 or modules included there in may be performed as a sequential process and/or be performed in parallel, concurrently, and/or in a distributed environment. According to an exemplary embodiment, the order of operations may be rearranged without departing from the spirit of the disclosed subject matter. The control module 205 and the modules or engines included therein may be configured to execute program code or programmable logic to perform the functions discussed herein, such as may be stored in the Content Data Store(s) 210 or other storage means.

The control module 205 can receive video content from the one or more tuners 200 and instruct the one or more tuners 200 to tune to a specific channel. For example, the control module 205 can instruct a tuner 200 to tune to a channel designated for live viewing by a customer. As another example, the control module can instruct a tuner 200 to tune to a channel designated for recording by a customer.

In embodiments, the control module 205 can forward content to a data store. For example, when a user designates a channel for recording or pauses a channel, the control module 205 can forward content associated with the channel to one or more content data stores 210. Upon receiving video content, the control module 205 can forward the content to one or more media players. For example, when a customer requests to view recorded content or live television, the control module 205 can forward content received from a tuner 200 to a multimedia device 115 for display on a television (or other display device). As another example, when a customer tunes a multimedia device 115 to a channel that was paused on the same or a different multimedia player, the control module 205 can forward content associated with the paused channel (e.g., content stored on the content data store 210) to the multimedia device 115 via the home network interface 215.

The control module 205 can convert a signal received through the tuner 200 into stream data (e.g., MPEG stream data) for transmission to a multimedia player and/or a storage device (e.g., content data store(s) 210) as a program file. In embodiments, the control module 205 can generate an index to associate a timestamp with a specific location of the program file. When a user issues a transport control command (e.g., rewind, replay, fast-forward, skip, etc.), the control module 205 can interpret the command and can use the index to retrieve the corresponding data from storage for transmission to the multimedia device 110.

Figure 3:
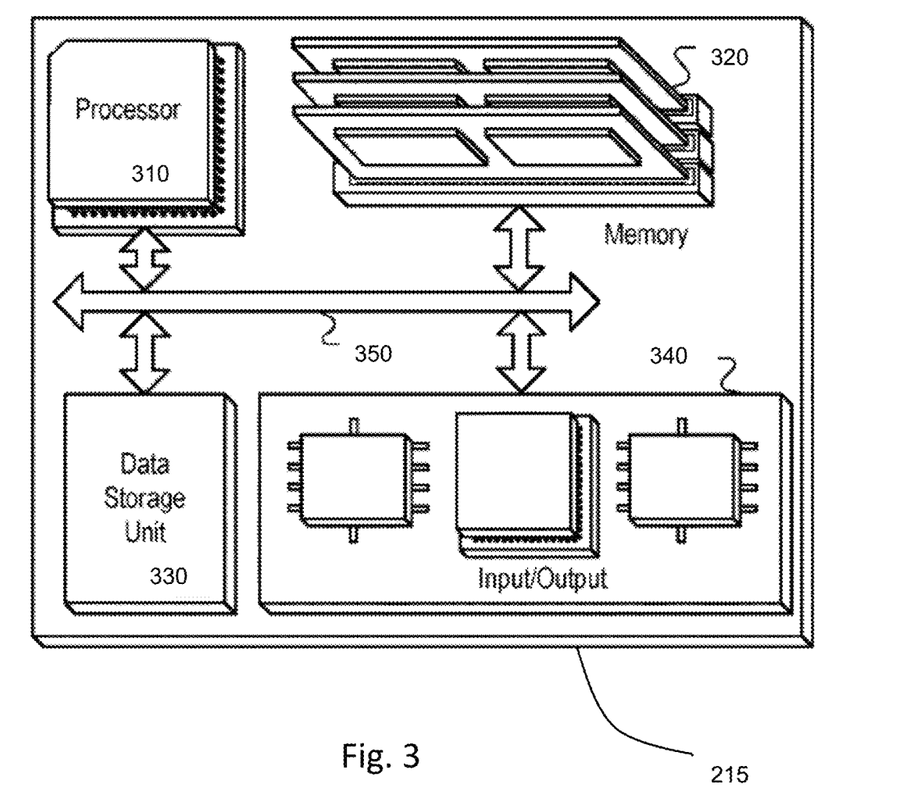
FIG. 3 is a diagram of various multimedia devices that can be connected to a television in accordance with an exemplary embodiment of the present disclosure.

FIG. 3 is a block diagram illustrating the hardware configuration of an exemplary control module 205 of the multimedia device 110. The control module 215 can include a processor 310, a memory 320, a storage device 330, and an input/output device 340. Each of the components 310, 320, 330, and 340 can, for example, be interconnected using a system bus 350. The processor 310 can be capable of processing instructions for execution within the control module 215. In one implementation, the processor 310 can be a single-threaded processor.

In another implementation, the processor 310 can be a multithreaded processor. The processor 310 can be capable of processing instructions stored in the memory 320 or on the storage device 330. Information can be stored within the memory 320 that is within the control module 205 or alternatively in content data stores 210 or external storage such as a cloud storage through the home network interface 215. In one implementation, the memory 320 can be a computer-readable medium. In one implementation, the memory 320 can be a volatile memory unit. In another implementation, the memory 320 can be a nonvolatile memory unit.

In some implementations, the storage device 330 can be capable of providing mass storage for the control module 205 or the multimedia device 110 in general. In one implementation, the storage device 330 can be a computer-readable medium. In various different implementations, the storage device 330 can, for example, include a hard disk device, an optical disk device, flash memory or some other large capacity storage device. The input/output device 340 provides input/output operations for the control module 205. In embodiments, the input/output device 340 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to another multimedia device 115 of FIG. 1 (e.g., television, mobile device, tablet, computer, STB, etc.). Alternatively the input/output module 340 can be omitted and incorporated as part of the home network interface 215.

In embodiments, the multimedia device's control module 205, additionally records the actions taken by the user in the content data stores 210. Data including channel or program type can be recorded along with a time stamp, indicating when the program was accessed and for how long. With this data the control module 205 or modules connected to the network 130 can determine usage patterns.

Data stores 210 can take a variety of forms. The data stores 210 can take the form of a memory that can perform the functions discussed herein. The data stores 210 may be comprised of one or more types of memory using one or more suitable types of memory storage, such as random access memory, read-only memory, hard disk drives, solid state drives, magnetic tape storage, etc. In some cases the data stores 210 can be non-transitory computer readable media which may be configured to store data suitable for execution by the multimedia device 110 in performing the functions discussed herein. The data stores 210 may store data in any suitable type of configuration, such as in one or more lists database, tables, etc., which may store the data in a suitable data format and schema. In some instances the data stores 210 may include one or more relational databases, which may utilize structured query language for the storage, identification, modifying, updating, accessing, etc. of the structured data sets stored therein. Additionally metadata may be used to identify or fine specific multimedia files.

The data stores 210 may include a database for a particular user. The user's database may be configured to store a plurality of user profiles using a suitable storage format and schema. For example, the user database may be a library of user profiles, metadata, recordings and/or other types of data. The data stores 210 can also include a remote and/or removable memory device such as storage space provided at a network location, a disc such as a Digital Versatile Disc (DVD), or on a flash memory device that is capable of storing user data.

The data stores 210 may also be structured data sets configured to store data related to an external device (e.g., other client multimedia devices and or internet of things (IOT) devices) that may be controlled via the methods discussed herein. Each device profile may be configured to store communication data for establishing a communication channel with external devices, data associated with communicating with a device's application programs, control settings or options, interface data for displaying an interface related to the control thereof, etc. The data stores 210 may also be configured to store program data for application programs to be executed by a processor of the multimedia device, such as program code for applications. According to an exemplary embodiment, the data stores 210 can also include a remote and/or removable memory device such as storage space provided at a network location or on a flash memory device.

The multimedia device 110 can record usage data for a single user or a plurality of users. Where a plurality of users use the system, the user can indicate which user is using the system by performing an action, for example entering a user code, or selecting a user profile. Alternatively based on a user's previous activities, the system can use Artificial Intelligence (AI) or Machine learning to determine which user is using the system.

Figure 4:
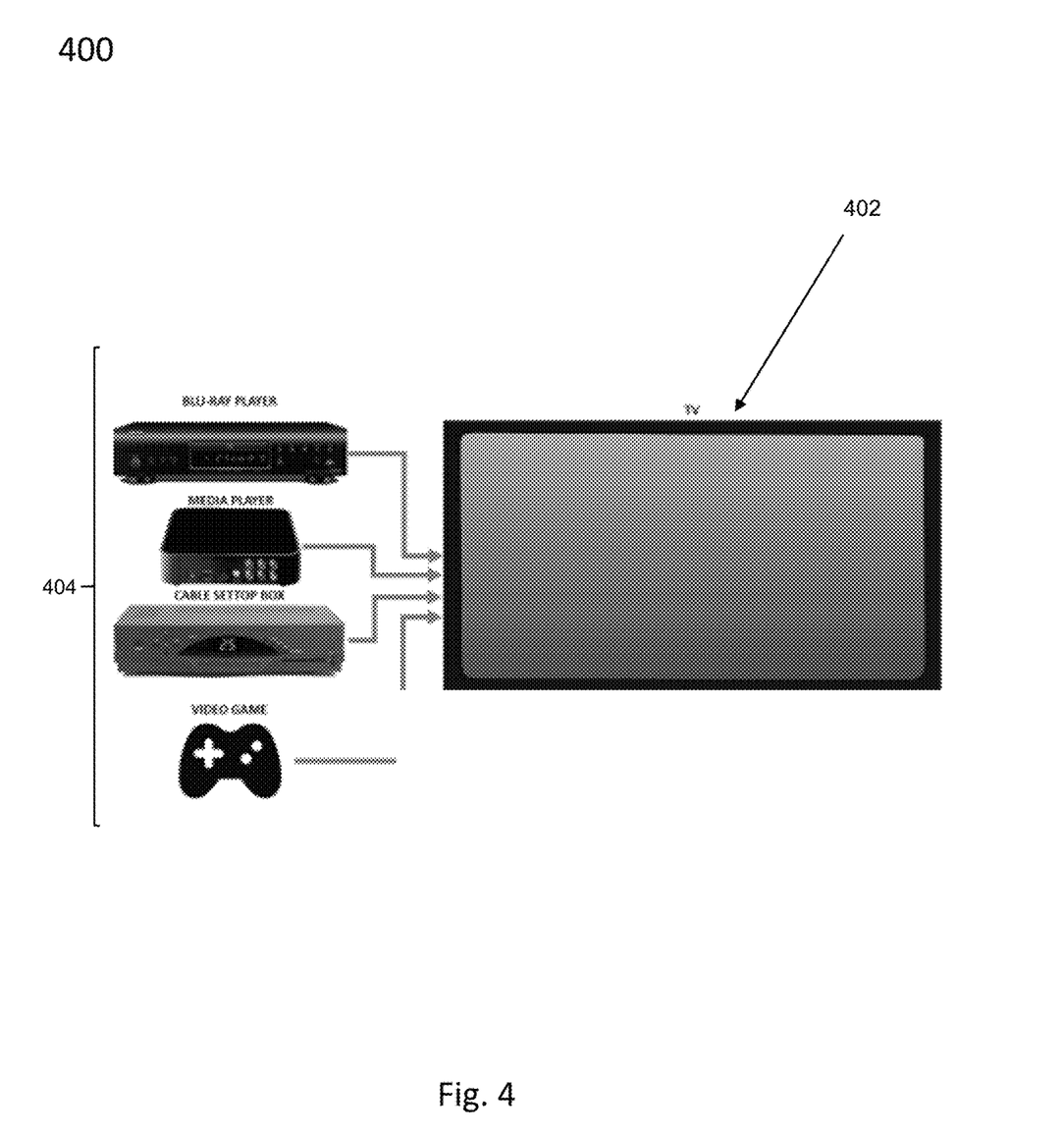
FIG. 4. is a block diagram illustrating the hardware configuration of an exemplary control module of the multimedia device

The system 100 is not limited to using Set-top Boxes, the system can be implemented with any multimedia device 110. FIG. 4 is a diagram of various multimedia devices 404 that can be connected to a television 402 in accordance with an exemplary embodiment of the present disclosure. Such device include but are not limited to: Blu-Ray players, DVD players, Media Players, Video Game players, and other multimedia devices 404. Further the system can be implemented in a stand-alone television 402 such as a so-called Smart TV, which includes much of the functionality of a standard Set-Top Box. The multimedia devices 404 and/or television 402 correspond to the multimedia device 110 or 115 of FIG. 1.

The multimedia device 404 connects to an outside media source including cable, broadcast, satellite dish and other wired and wireless sources. This connection can be through wireless communication links such as Wi-FI (IEEE 802.11), cellular (Universal Mobile Telecommunication system (UMTS)), Long-Term Evolution (LTE), etc.), Bluetooth, ZigBee, NFC, Li-Fi, VHF, UHF, and other well-known systems. The connection can also be a wired system such as provided over Ethernet cable, coaxial cable, telephone, broadband over power lines (BPL) and other wired means.

Typically a user will often use the multimedia device 404 to experience multimedia content at regular intervals and types. For example, they may have a specific television program, which airs each week at a specific day and time. Alternatively they may watch a previously recorded program at a similar time. When the user goes to watch the program, typically the user will turn on the television 402 and/or a set-top-box or other multimedia device 404. The multimedia device 404 will retrieve the desired program and display it on the television 402. At the same time the multimedia device will record the time and date that the multimedia device 404 was turned on in the data store(s) 210. Alternatively where the television 402 is a so-called smart TV no other multimedia device 404 may be used and the smart TV 402 will retrieve a desired program itself and record usage patterns on a data store 410 that is part of the TV and/or cloud storage.

Figure 5:
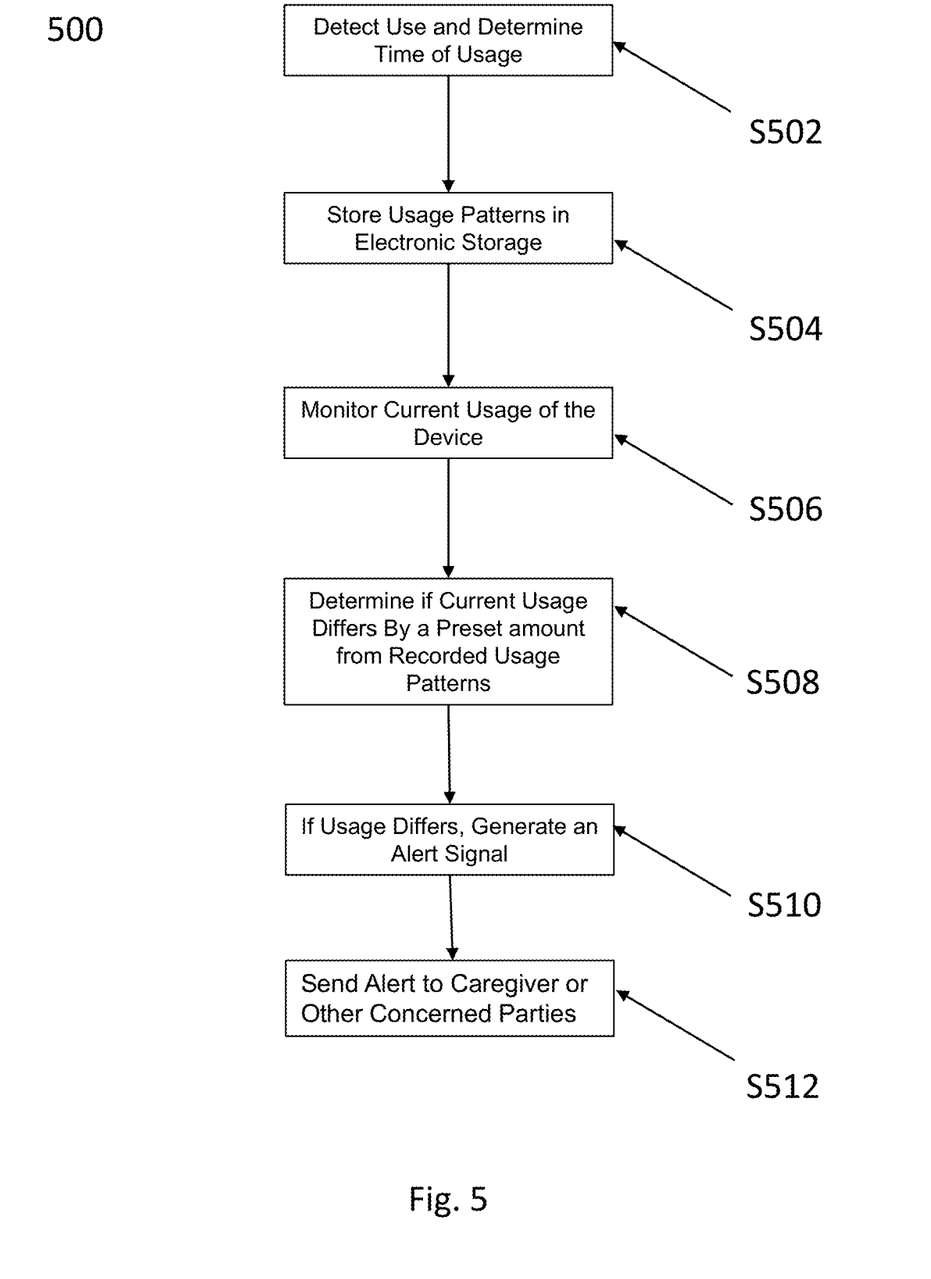
FIG. 5 is an exemplary method for generating an alert signal according to an exemplary embodiment of the present disclosure.

FIG. 5 is an exemplary method 500 for generating an alert signal according to an exemplary embodiment. The method includes determining a usage pattern of the multimedia device 110 such as the television 402 or other connected multimedia device 404 and sending an alert to caregivers or other concerned parties when the usage deviates from a normal usage patterns.

In step 502, the control module 205 of the multimedia device 110, detects usage and determines a time. The control module 205 may determine that a user has turned on a set-top-box or detect individual programs/media being requested by the user. When the control module 205 determines a user is using the multimedia device 110, it also determines the time the usage occurs.

The time and usage is recorded in step 504 in Content Data Stores(s) 210 or in other suitable storage. The usage can be recorded as a single data entry that includes channel or program type and a time stamp.

In step 506 the control module 205 monitors the stored usage data and determines a pattern. By looking at the time-stamps over a sufficient period of time such as two weeks to determine a viewing pattern or less time to determine at what times the multimedia device is typically turned on, a pattern should emerge that can be determined by the control module 205. Such determining can be performed by Artificial intelligence and/or machine learning algorithms.

Alternatively the time-stamps can be compared with patterns that are supplied by a caregiver or user during setup or at other times. The user or caregiver can set the preset amount through an interface on the multi-media device 110, a connected device, or through the network to a third party. The connected device can comprise a laptop, computer, smart phone, gaming system, telephone system, or any other device that can receive an input from the caregiver or user and relay it to the multimedia device 110. The third party can be a service provider or broadcaster which provides a monitoring service. Alternatively the preset amount can be set-up by nurses, doctor, or other medical and/or concerned personnel by a local monitoring system at a nurse's station or other monitoring/telemetry systems.

The system or caregiver can provide additional patterns or instructions. For example the caregiver could have the multimedia device 110 indicate that the user, every hour, has to get up and walk around. The user would indicate to the multimedia device 110, by pushing the pause button or other dedicated function button or input, to indicate that they have complied. Alternative other sensors could detect the user's activities and verify that the user is performing the desired actions, such as motion sensors, cameras, and others. Failing to respond or perform the activity a predetermined number of times such as three times in a row, would trigger an alarm to the caregiver.

In step 508 the control module 205 analyzes the current usage of the multimedia device 110. Depending on the level of sensitivity and/or other criteria for determining an abnormal situation, the module can compare current or Real-Time usage to historical patterns that were recorded and determined in steps 504 and 506. The level of sensitivity and/or other criteria can be set by a user or a caregiver through an interface of the multimedia device 110. Additionally or alternatively the caregiver can provide sensitivity levels by a remote device or application.

The level of sensitivity and/or other criteria for determining an abnormal situation can take various forms. It could be related to leaving the multimedia device 110 on or active for a longer period of time them normal. Another example would be that the multimedia 110 device is not turned on during multiple time periods that historically it should be turned on. Depending on the level of sensitivity desired by a user or caregiver, the preset amount that indicates an emergency can be set. Some exemplary preset amounts are: a high level of sensitivity such as the channel not being changed every two hours and low level of sensitive such as the multimedia device 110 not being activated for two or three days.

Alternatively, the determination of the level of sensitivity can be completely automatic using machine learning or other forms of Artificial Intelligence to determine when a user most likely needs assistance from a caregiver or other concerned parties such as emergency medical services (EMS). This could be done automatically by the control module 205 analyzing the stored usage history and detecting a pattern and amount the user or a group of similar users typically deviates from the detected pattern. Alternative the machine learning could be manually initiated by a user navigating to a specific screen of the multimedia device 110.

The multimedia device 110 can present the user or caregiver a choice of several preset amounts such as a numerical amount by which the current usage can differ from recorded usage patterns or a selection of sensitivity including high and low as described above. An exemplary embodiment includes having the caregiver enter the amount of deviation by a graphical user interface (GUI) on a connected mobile device or through a set-top-box. Other common ways of entering the data are also conceived of and acceptable depending on the environment, user, caregiver, and/or type of multimedia device. Once the multimedia device 110 receives input from the user or caregiver of the predetermined criteria this can be stored in the data stores 210 or in other easily accessed storage such as an internal memory or networked Cloud storage.

In step 510, once the control module 205 determines that current usage differs by a preset amount for recorded usage patterns in step 508, the system generate an alert signal. In an exemplary embodiments the alert signal can be in the form of a SMS message or other common message systems such as provided by social media. Alternatively the alert signal can take the form of an email message, an automated telephone call, or other signaling/messaging forms. This could be a short message in the form of email, SMS, an automated phone call, etc sent to a family member. Alternatively for a caregiver that is a medical professional a detailed message such as an email could including telemetry, health, and/or usage data. Other messages consistent with the present disclosure for alerting a caregiver should also be considered as appropriate.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

Techniques consistent with the present disclosure provide, among other features, systems and methods for monitoring a user for well-being by monitoring usage patterns of a multimedia device. Further the present disclosure could be used with purpose built devices such as door sensor and is not limited to multimedia devices. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A multimedia device for monitoring a user for well-being comprising:

a processor configured to:
  access media content over one or more networks;
  monitor usage of the multimedia device over a period of time, wherein monitoring usage of the multimedia devices includes:
    detecting usage of the multimedia device by a user, wherein the usage of the multimedia device includes activation of the multimedia device;
    in response to detecting usage of the multimedia device, determining at least a timestamp of the usage;
    recording the timestamp in a user profile;
  generate one or more device usage patterns of the multimedia device based on the monitored usage of the multimedia device in the user profile;
  store the one or more device usage patterns of the multimedia device in the user profile;
  detect a current usage of the multimedia device;
  compare the current usage of the multimedia device to the one or more device usage patterns;
  determine the current usage does not match at least one of the one or more device usage patterns;
  generate an alert signal indicating a device usage abnormality; and
  send the alert signal to a remote device associated with a concerned party of the user over the one or more networks.

2. The multimedia device of claim 1, wherein the one or more networks includes a wireless network or a wired network.

3. The multimedia device of claim 1, wherein the alert signal is an SMS message or an email message.

4. The multimedia device of claim 1, wherein the multimedia device is a set-top-box, a television, or an appliance included in an Internet of Things (IOT) system.

5. The multimedia device of claim 1, comprising:
  the processor configured to receive a preset deviation amount, the preset deviation amount being a threshold amount a user can deviate from the one or more device usage patterns; and
  wherein the determining the current usage does not match the one or more device usage patterns includes:
    the processor configured to determine the current usage deviates from the one or more device usage patterns more than the preset deviation amount.

6. The system of claim 1, wherein the one or more device usage patterns of the multimedia device are generated using artificial intelligence and/or a machine learning algorithm.

7. The multimedia device of claim 1, wherein the user profile is stored in a memory of the multimedia device, the memory being an internal memory of the multimedia device or an external memory.

8. A method for monitoring a user for well-being comprising the steps of:
  determining-one or more device usage patterns of a multimedia device by a user based on an activation history of the multimedia device and an access history of media content, wherein the activation history and the access history includes at least a timestamp indicating a time of activation of the multimedia device and a time of access of the media content by the user;
  generating a user profile for the user, the user profile including the one or more device usage patterns;
  storing in an electronic storage of the multimedia device the user profile including the one or more device usage patterns of the multimedia device;
  monitoring a current usage of the multimedia device;
  comparing the current usage of the multimedia device to the one or more device usage patterns;
  determining the current usage does not match at least one of the one or more device usage patterns;
  generating an alert signal indicating a device usage abnormality; and
  sending the alert signal to a remote device associated with a concerned party of the user over one or more networks.

9. The method of claim 8, comprising:
  receiving a preset deviation amount, the preset deviation amount being a threshold amount a user can deviate from the one or more device usage patterns; and
  wherein the determining the current usage does not match the one or more device usage patterns includes:
    determining the current usage deviates from the one or more device usage patterns more than the preset deviation amount.

10. The method of claim 8, wherein the multimedia device determines the one or more usage patterns using artificial intelligence and/or a machine learning algorithm.

11. A non-transitory computer readable media having instructions operable to cause one or more processors to perform operations for monitoring a user for well-being comprising the steps of:
  determining-one or more device usage patterns of a multimedia device by a user based on an activation history of the multimedia device and an access history of media content, wherein the activation history and the access history includes at least a timestamp indicating a time of activation of the multimedia device and a time of access of the media content by the user;
  generating a user profile for the user, the user profile including the one or more device usage patterns;
  storing in an electronic storage of the multimedia device the user profile including the one or more device usage patterns of the multimedia device;
  monitoring a current usage of the multimedia device;
  comparing the current usage of the multimedia device to the one or more device usage patterns;
  determining the current usage does not match at least one of the one or more device usage patterns;
  generating an alert signal indicating a device usage abnormality; and
  sending the alert signal to a remote device associated with a concerned party of the user over one or more networks.

12. The non-transitory computer readable media of claim 11, comprising:
  receiving a preset deviation amount, the preset deviation amount being a threshold amount a user can deviate from the one or more device usage patterns; and
  wherein the determining the current usage does not match the one or more device usage patterns includes:
    determining the current usage deviates from the one or more device usage patterns more than the preset deviation amount.

13. The non-transitory computer readable media of claim 11, wherein the multimedia device determines the one or more usage patterns using artificial intelligence and/or a machine learning algorithm.

14. The multimedia device of claim 1, comprising:
  the processor configured to:
    receive one or more pre-determined device usage patterns; and wherein the determining the current usage does not match the one or more device usage patterns includes:

the processor configured to determine the current usage does not match the one or more pre-determined device usage patterns.

15. The multimedia device of claim 14, wherein the one or more pre-determined device usage patterns are supplied by the user.

16. The multimedia device of claim 14, wherein the one or more pre-determined device usage patterns are supplied by a concerned party of the user.

17. The multimedia device of claim 1, comprising:

the processor configured to:

receive one or more user instructions to be displayed via the multimedia device, the one or more user instructions including at least a required action and a time interval for display;

store the one or more user instructions in the user profile;

determine the current usage of the multimedia device meets the time interval of the one or more user instructions; and display an alert via the multimedia device to the user, the alert indicating the required action.

18. The method of claim 8, comprising:

receiving one or more pre-determined device usage patterns; and wherein the determining the current usage does not match the one or more device usage patterns includes:

determining the current usage does not match the one or more pre-determined device usage patterns.

19. The method of claim 8, comprising:

receiving one or more user instructions to be displayed via the multimedia device, the one or more user instructions including at least a required action and a time interval for display;

storing the one or more user instructions in the user profile;

determining the current usage of the multimedia device meets the time interval of the one or more user instructions; and displaying an alert via the multimedia device to the user, the alert indicating the required action.

20. The non-transitory computer readable media of claim 11, comprising:

receiving one or more pre-determined device usage patterns; and wherein the determining the current usage does not match the one or more device usage patterns includes:

determining the current usage does not match the one or more pre-determined device usage patterns.

21. The non-transitory computer readable media of claim 11, comprising:

receiving one or more user instructions to be displayed via the multimedia device, the one or more user instructions including at least a required action and a time interval for display;

storing the one or more user instructions in the user profile;

determining the current usage of the multimedia device meets the time interval of the one or more user instructions; and displaying an alert via the multimedia device to the user, the alert indicating the required action.

\* \* \* \* \*